3,330,353
THERMAL SOAK ZONES BY FLUIDIZED FRACTURES IN UNCONSOLIDATED, PETROLEUM PRODUCING RESERVOIRS
Richard A. Flohr, Westport, Conn., assignor to Shell Oil Company, New York, N.Y., a corporation of Delaware
Filed Sept. 22, 1964, Ser. No. 398,328
2 Claims. (Cl. 166—40)

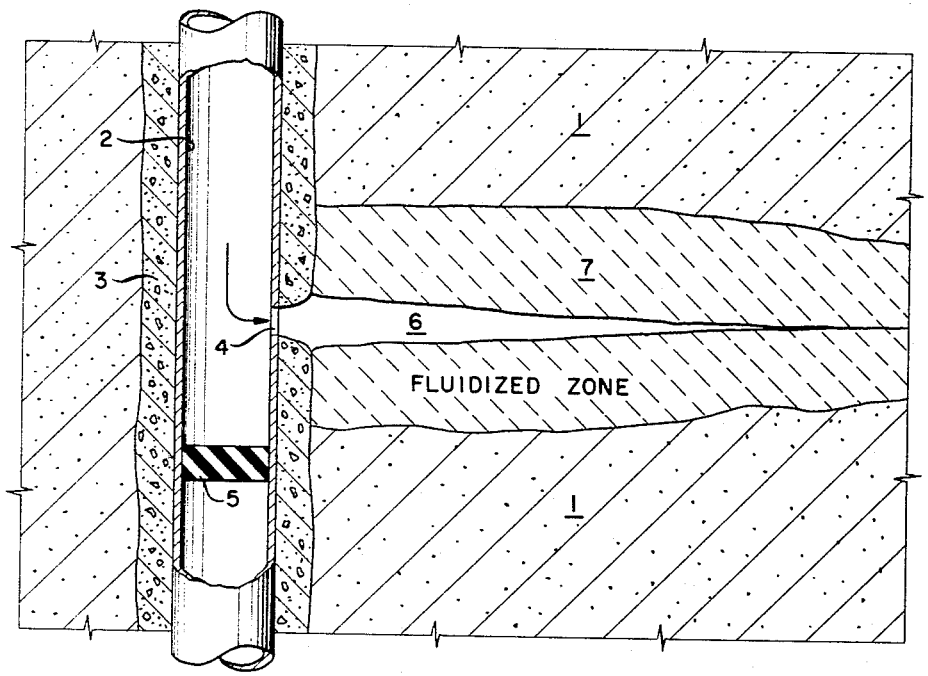

ABSTRACT OF THE DISCLOSURE

A method of producing viscous petroleums from unconsolidated formations by injecting steam at a pressure above that of the over-burden pressure to produce horizontal fluidized zones without shattering the formation, shutting down the well for a soak period and thereafter recovering the viscous petroleum products.

---

This invention relates to a method of introducing thermal energy into unconsolidated, petroleum-producing reservoirs, and more particularly, to such a method for the introduction of thermal energy into subterranean reservoirs where the petroleum is so viscous that a relatively fluid-impermeable matrix of petroleum and formation exists.

Considerable amounts of petroleum, both in the United States and in other parts of the world, exist in a condition of high viscosity in the natural state of the reservoir. In some cases, the viscosity is sufficient to render the petroleum virtually immobile at normal reservoir temperatures and pressures. Typical examples of such a formation are the so-called tar sands which are found in the United States and Canada. There are also deposits of petroleum in the United States, somewhat less viscous than the petroleum in the tar sands, but which are non-flowable at normal reservoir pressures and temperatures.

In many cases, these highly viscous petroleum deposits are associated with an unconsolidated reservoir formation and cannot be produced by the so-called primary techniques. Further, due to the relatively impermeable matrix of petroleum and formation it is extremely difficult to recover the petroleum by the secondary techniques of recovery since the matrix is almost fluid impermeable. Because of this fluid impermeability, the penetration of injected fluids, whether heated fluids or solvents, is minimal and is usually localized about the well bore proper. In such situations, it is very difficult to effect the economic recovery of these petroleum deposits.

In the past, this problem has been attacked by fracturing the formation, i.e., the petroleum-sand matrix with fracturing fluid, usually between spaced wells. Once the fracture has been formed, various fluids, such as solvents, heat-carrying liquids and/or chemically active materials, can be introduced into the fissures formed by the fracturing for aiding in petroleum recovery as they flow between the spaced wells. The principal difficulty in this technique is that the fissures are quite small and do not permit an adequate flow of fluid to effect economical production of the formation. Heated fluids will reduce the viscosity of the reservoir petroleum; however, they will cool relatively quickly when passing through the narrow passage of the fissures. Cooling and condensation of the fluids tends to further restrict the flow through the fissures formed by fracturing.

The problems of economically establishing sizable permeable zones through which thermal energy can be applied to the reservoir, especially in reservoirs which have not been previously produced because of the high viscosity of the crude, is acute since no voids exist through which the injected fluids can penetrate. This implies that, in such formations as tar sands and unconsolidated reservoirs containing viscous crudes, some treatment must be undertaken to give the reservoir permeability since there has been no production which would leave voids. Such matrices are substantially impermeable to immiscible fluids and even miscible fluids.

In its broadest aspect, this invention contemplates the formation of thermal soak zones in unconsolidated reservoir formations containing highly viscous petroleum deposits. The method encompasses penetrating the formation with a well bore, sealing a casing string in the well bore at least to the extent of the penetration of the casing through the reservoir, perforating the casing string and sealant, and subjecting the formation to heated fluids in a gaseous form at pressures greater than the overburden pressure of the formation to form fluidized fracture zones extending outwardly from the well bore into the formation which serve as thermal soak zones. The well is usually shut-in under pressure for a soak period and then produced through the same well.

One of the big advantages of the invention is that fairly large thermal soak zones are formed, which will enhance the recovery of the viscous petroleum from the reservoir by decreasing the viscosity of the deposits contiguous to such zones. Also, these relatively large soak zones serve as collection basins for the heated petroleum which will drain, by gravity, into the thermal soak zones and from there into the well bore itself since these zones are made highly permeable by the practice of the invention. Further, the residual steam in the reservoir when the well is vented will tend to drive the heated petroleum into the well bore.

The single accompanying figure is a vertical section of a portion of an unconsolidated reservoir penetrated by a casing string sealed into the reservoir formation.

To aid in the understanding of this invention, reference is made to the accompanying figure which shows a portion of an unconsolidated reservoir 1 penetrated by a casing string 2 which is cemented in place by a sealant 3, such as cement. The casing string is perforated to form one or more ports 4, and a packer 5 is located below the perforation when it is desirable to isolate the perforated section from the lower end of the casing string. Obviously, the casing string 2 could be perforated at numerous spaced locations along its vertical traverse of the reservoir but illustration of this is not necessary for understanding the invention. The number and type of such perforations will depend upon the particular conditions of the reservoir, the viscosity of the oil contained therein, and other factors well understood by those skilled in the art. Circumferential perforations are desirable at each location but are likewise not illustrated in the drawing.

Any gaseous fluid which will remain so under the conditions of this invention as practiced is satisfactory. Hydrocarbon gases and steam are examples, but the latter is the most economical and will be used in the description of the invention.

In the practice of this invention hot, high-pressure steam is introduced into the casing string or a tubing string on which a packer may be placed above port 4 after the well has been prepared as described above and flows downward to the port 4 from which it is vented into the formation. It is important that the pressure of the steam be greater than that of the overburden in order to accomplish the practice of this invention. As high-pressure steam passes through port 4 and contacts the formation, it will fracture the petroleum-sand matrix, as indicated by fracture 6, as the seam moves outward through the formation. At the pressures the steam is introduced into the unconsolidated reservoir formation, it causes portions 7 of the reservoir solids immediately adjacent to fracture 6 to be suspended, forming what is known as a fluidized mass which exhibits many of the properties of a true liquid of extremely high viscosity, such as hydrostatic head. Therefore, as the steam front moves outward through the fracture 6 it will form a fluidized zone 7 to a much greater areal extent than the fracture 6.

Because of the pressure greater than the overburden pressure the fracture quickly expands outwardly and generally horizontally from the port 4. Since the fluidizing action contiguously about the fracture provides a relatively large areal area for thermal soak it is capable of transferring large quantities of thermal energy to the reservoir immediately surrounding the fluidized zone, especially that area located above the fluidized zone. Of course, the heating of the petroleum-sand matrix lowers the viscosity of the petroleum which drains downwardly into the fluidized zone where it is subjected to still higher temperatures. This lowers the viscosity further, and since these fluidized zones are permeable, the petroleum will flow through them into the casing string from which it can be recovered.

Technically the fluidized zone 7 is only fluidized while the steam is being injected, but we will, for convenience, refer to this zone as the fluidized zone, meaning that which is or was fluidized.

Some petroleum flows into the well during the steam injection which increases voids in the formation. In addition there may be a slight heaving of the overburden during injection which insures void volume for the steam. After the injection has been completed, it may be desirable to shut in the well to trap the steam in the fluidized zone 7 so that the maximum thermal energy transfer can be accomplished. In fact, it is the preferred practice of the invention to shut in the well after the injection has been accomplished in order to allow a soak period. This shut-in period can vary to a considerable extent depending upon the reservoir conditions. A shut-in period of about a week is usually desirable but a period of months can have a very beneficial effect.

When the casing string is perforated circumferentially in a plane normal to the well axis, the fluidized zone 7 has the appearance of a large pancake which is generally horizontally oriented in the reservoir.

When the steam injection is stopped the fluidization around the fracture is terminated and there is no further advance of the fracture in the center of the fluidized zone 7. In fact, at this point fracture 6 may be filled with the relatively loose fluidized sand of fluidized zone 7 immediately adjacent thereto. In practice the closure of the fracture is inconsequential since the steam will remain dispersed generally in the area of the previously fluidized zone 7 where effective thermal transfer to the formation can be accomplished. Further, the zones where fracture 6 developed will be highly permeable. Of course, there is a thermal gradient extending outwardly from the fracture 6 or from the point where fracture 6 was located to the periphery of the fluidized zone. Thus, petroleum draining to the center of the fluidized zone 7 is subjected to increasing temperatures.

The advantage of using the present method of introducing heat into unconsolidated reservoirs is that a rather large thermal soak zone is propagated outwardly from the casing string into the formation to provide an efficient heat source in the formation. The effect of this heat source is to lower the viscosity of the petroleum in the petroleum-sand matrix and allow it to drain into the fluidized zone and thence into the casing string where it can be recovered. Further, the fluidization of the zone increases its permeability and since the petroleum in the vicinity of the fluidized zone is heated to a relatively high temperature it will flow quite readily into the casing string through this hot zone.

In the preferred practice of this invention the well is shut-in after the formation has been injected with high-pressure steam in order that the steam trapped in the fluidized zone can disperse its heat throughout the formation to insure more effective recovery of the petroleum. This shut-in step of the recovery, whereby the well is shut in for a period of days, weeks or even months after the injection, seems to be useful to achieve the most effective results. Certainly, the fluidized zone 7, which acts as a heat source, is better able to transfer a greater portion of the heat of the steam to the formation by the use of a shut-in period. It is desirable to shut the well in at or near injection pressures which can be maintained during the soak.

After a period of soak, i.e., a period in which the well is shut in, the residual pressure in the casing string is vented and petroleum flow into the casing through the perforations accelerates. In some cases, perforations, in addition to those perforations used in the fluidization zones 7 into the reservoir, may be desirable and such additional perforations can be made to the casing string to enhance the recovery of petroleum. This can be accomplished with a shot-type tool, or some similar device.

It should be obvious that the fluidized zones 7 can be created at multiple levels in the same reservoir or in multiple reservoirs which the casing string penetrates depending upon the particular characteristics of the formation. And, it is necessary that sufficient heat is propagated in the reservoir at the various levels to insure the petroleum is heated adequately and it is desirable since it gives fairly uniform temperature in the reservoir.

Each fluidized zone 7, which is generally horizontally extensive in the reservoir, can be formed simultaneously or separately at various spaced levels through the use of a straddle packer. Sometimes it is desirable to form each fluidized zone separately to insure formation integrity because of the high pressures.

Generally, it is required that the steam injection in this process be at a pressure greater than overburden. However, the pressure must be controlled within limits in order to create the fluidized zones described above and avoid destruction of the reservoir integrity. It was found that the gaseous steam should be injected at a pressure approximately 1.1 to 1.8 of the overburden pressures. In this pressure range it is found that the steam penetrates quickly and a substantial distance from the well bore even after a small amount of steam has been injected. In theory, it is believed that a horizontal fracture forms and is surrounded by a fluidized zone (a turbulent zone of high permeability) caused by the pressurized gaseous fluid moving outwardly from the casing string into the formation. If the casing string is perforated circumferentially, the fluidized zone which moves outwardly into the formation would be generally pancake in shape (disk-shaped), with the thickness tapering slightly toward the periphery of the pancake at increased distances from the casing string.

The following example is intended to be generally illustrative of the invention and is not intended to be a restriction thereon.

*Example*

A well was drilled in the East Coalinga area in southern California and penetrated an unconsolidated reservoir formation in which the petroleum was unproducible by the primary method. This petroleum was fairly viscous having a viscosity at reservoir temperature of approximately 7000 centipoises and formed a petroleum-sand matrix which was generally impermeable to fluids. The well casing was cemented in the area of the reservoir and perforated circumferentially in the reservoir area. Thereafter 12,000 bbls. of water as steam was injected into the formation through the casing string at a pressure of 1300 p.s.i.g. and previous tests have indicated that the overburden pressure was approximately 900 p.s.i.g. After injection of the 12,000 barrels of water as steam the well was shut in for a soak period of 5 days at injection pressure. After the soak period the residual pressure in the casing string was vented and the well was produced, averaging 250 barrels of oil per day for several days which eventually subsided to 85 barrels of oil per day which was maintained for approximately four months.

I claim as my invention:

1. A method of producing viscous liquid petroleum products which are substantially non-flowing at normal reservoir temperatures from unconsolidated impermeable reservoir formations the viscous liquid petroleum products being in a liquid fluidized state as recovered from the formation without being subjected to distillation in order to be in said state comprising:
  (a) penetrating such an unconsolidated impermeable reservoir with a borehole;
  (b) sealing a casing string in said borehole at least to the extent of its traverse of said reservoir;
  (c) perforating said casing string and sealant to provide fluid ingress and egress between the inside of said casing string and said reservoir;
  (d) injecting hot gaseous fluids at a pressure of at least 1.1 of that of the overburden pressure of said reservoir to produce a laterally extensive fluidized zone in said reservoir whereby the thermal energy of said hot gaseous fluid can be transferred to said reservoir;
  (e) shutting in said casing string under pressure sufficient to prevent the injected hot gaseous fluids from re-entering said casing string for a soak period,
  (f) venting the pressure within the borehole to a pressure less than that in the surrounding portion of the reservoir at a rate slow enough to prevent the shattering of the reservoir formation, and,
  (g) recovering the petroleum draining into said casing string.

2. A method of producing viscous liquid petroleum products which are substantially non-flowing at normal reservoir temperatures from tar sand reservoir formations in which the petroleum and formation forms a fluid-impermeable matrix the viscous liquid petroleum products being in a liquid fluidized state as recovered from the formation without being subjected to distillation in order to be in said state comprising:
  (a) penetrating such a tar sand reservoir with a borehole at least to the extent of its productive zone;
  (b) sealing a casing string in said borehole at least to the extent of said productive zone;
  (c) circumferentially perforating said casing string and sealant to provide fluid ingress and egress between the inside of the casing string and said reservoir;
  (d) injecting steam at a pressure of from 1.1 to 1.8 of that of the overburden pressure to produce a substantially horizontal, laterally extensive fluidized zone in said reservoir to provide a heat source whereby thermal energy will be transferred to said formation;
  (e) shutting in said casing string under pressure sufficient to prevent the injected steam from re-entering said casing string for a soak period;
  (f) subsequently venting the residual pressure in said casing string to a pressure less than that in the surrounding portion of the reservoir at a rate slow enough to prevent the shattering of the reservoir formation; and,
  (g) then recovering the petroleum draining into said casing string.

References Cited

UNITED STATES PATENTS

| | | | |
|---|---|---|---|
| 2,841,375 | 7/1958 | Salomonsson | 166—11 |
| 2,862,558 | 12/1958 | Dixon | 166—40 |
| 2,876,838 | 3/1959 | Williams | 166—11 |
| 2,952,450 | 9/1960 | Purre | 166—42 |
| 2,969,226 | 1/1961 | Huntington | 166—11 X |
| 3,259,186 | 7/1966 | Dietz | 166—40 X |

FOREIGN PATENTS 511,768  8/1939  Great Britain.

CHARLES E. O'CONNELL, *Primary Examiner.*

STEPHEN J. NOVOSAD, *Examiner.*